United States Patent [19]

Trakas

[11] Patent Number: 5,055,028

[45] Date of Patent: Oct. 8, 1991

[54] INTERNALLY HEATED TORPEDO WITH INTERNAL MELT DISTRIBUTION CHAMBER

[76] Inventor: Panos Trakas, 21 W. Wrightwood, Glendale Heights, Ill. 60139

[21] Appl. No.: 561,267

[22] Filed: Aug. 22, 1990

Related U.S. Application Priority Data

[63] Continuation of Ser. No. 335,113, Apr. 7, 1989, abandoned.

[51] Int. Cl.$^5$ .............................................. B29C 45/20
[52] U.S. Cl. ............................... 425/549; 264/328.15; 425/568; 425/570; 425/573
[58] Field of Search ................... 264/328.15; 425/549, 425/568, 570, 571, 573

[56] References Cited

U.S. PATENT DOCUMENTS

| | | | |
|---|---|---|---|
| 4,120,086 | 10/1978 | Crandell | 29/611 |
| 4,161,386 | 7/1979 | Osuna-Diaz | 425/549 |
| 4,304,544 | 12/1981 | Crandell | 425/549 |
| 4,376,244 | 3/1983 | Gellert | 219/523 |
| 4,433,969 | 2/1984 | Gellert | 425/549 |
| 4,576,567 | 3/1986 | Gellert | 425/549 |
| 4,577,685 | 12/1985 | Gellert | 425/549 |
| 4,611,394 | 9/1986 | Gellert | 29/611 |

OTHER PUBLICATIONS

"Update on Runnerless Molding: New Hardware, New Suppliers", *Plastics Technology*, Apr. 1985, pp. 93–100.

*Primary Examiner*—Timothy Heitbrink
*Attorney, Agent, or Firm*—Lockwood, Alex, Fitzgibbon & Cummings

[57] ABSTRACT

An integral heated torpedo for use in injection molding has an internal melt distribution chamber which distributes heated melt through multiple melt flow paths onto the exterior surface of the torpedo. The torpedo is formed from a single piece of metal and has an elongate body portion which extends axially from an enlarged end portion and which terminates in tip. The center of the torpedo body portion contains an axial cavity extending between the torpedo tip and the enlarged end portion. The bore is adapted to receive a heating element which includes a coil of resistance wire and a thermocouple which are surrounded by heat insulative material. A plurality of melt flow passages extend axially through the enlarged end portion and are disposed generally around the torpedo bore to provide a series of melt flow paths through the enlarged end portion onto the heated exterior surface of the torpedo body.

16 Claims, 2 Drawing Sheets

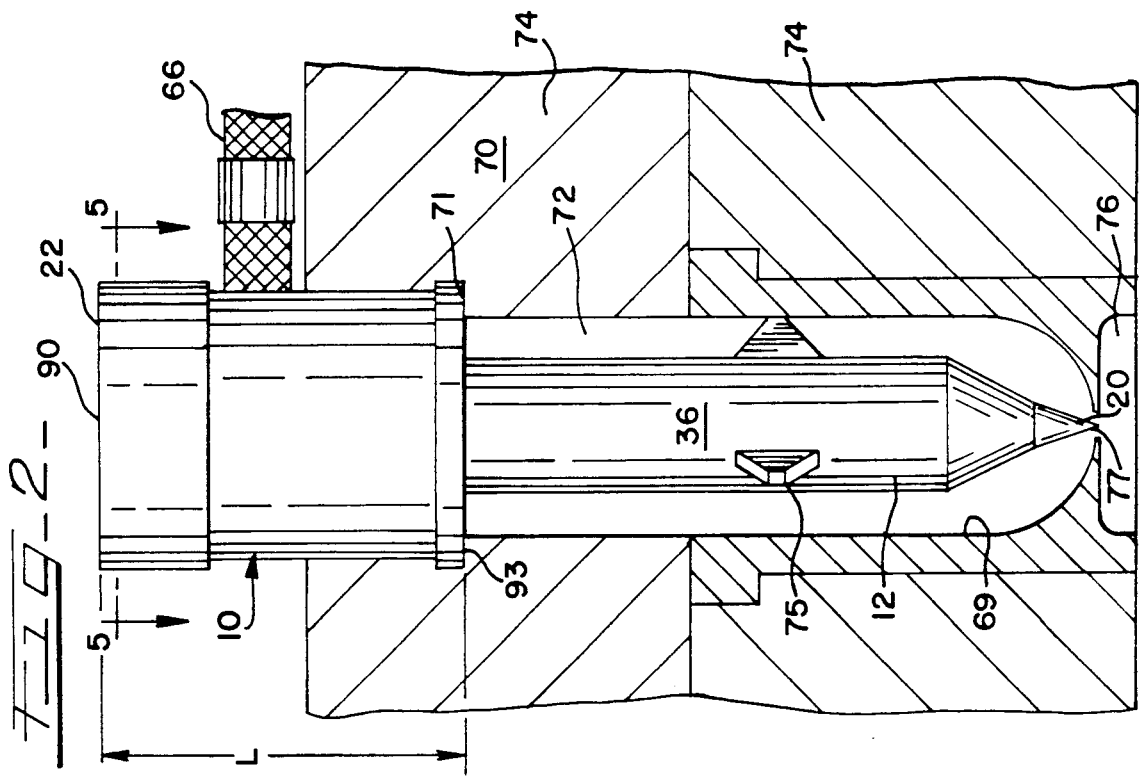
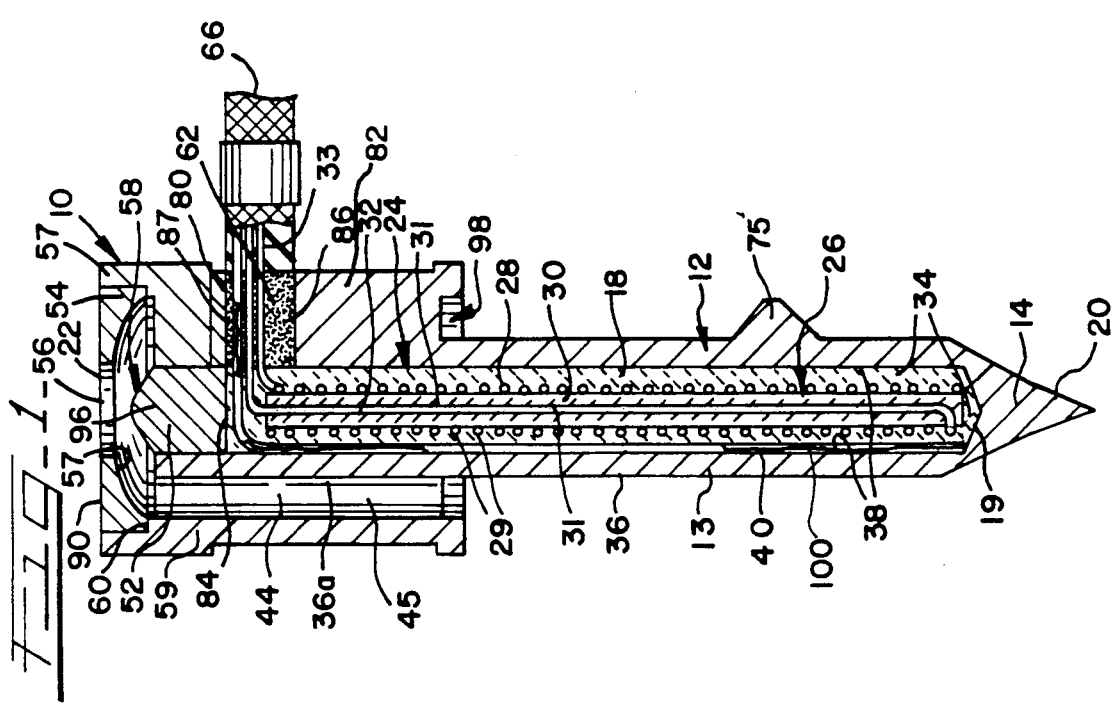

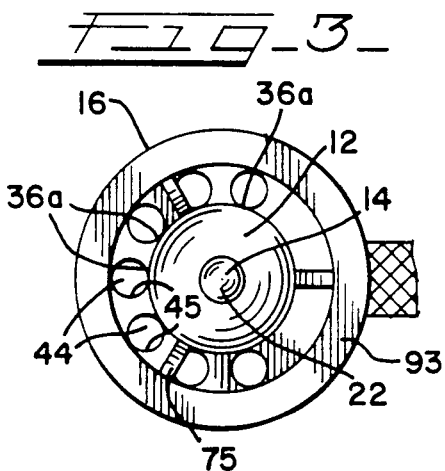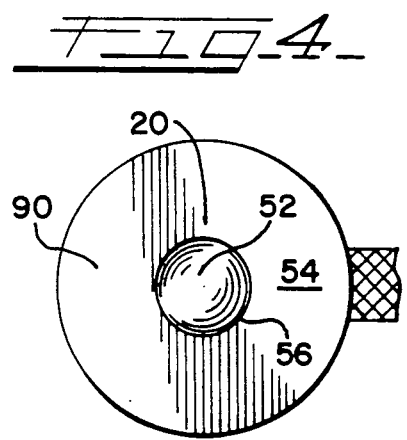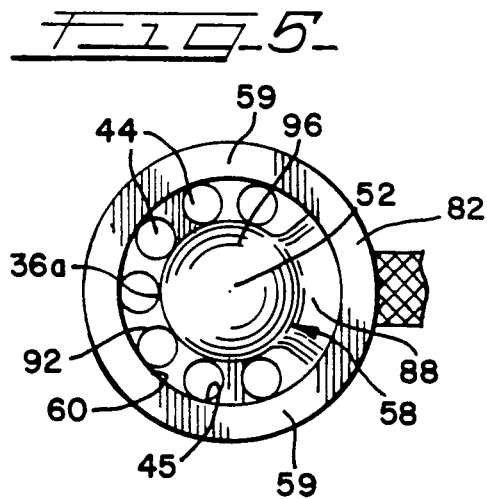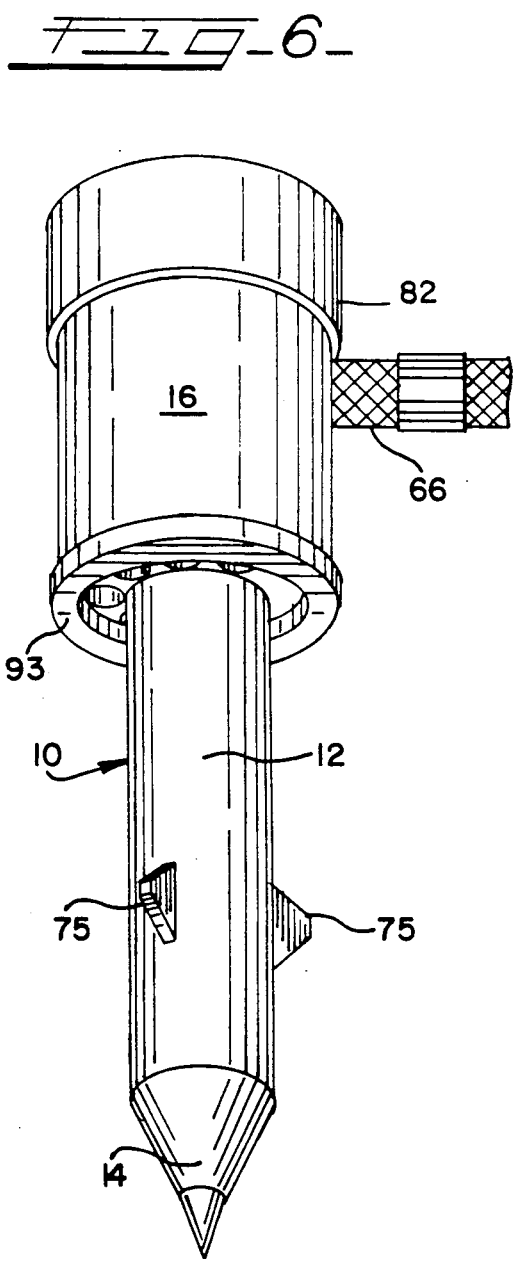

INTERNALLY HEATED TORPEDO WITH INTERNAL MELT DISTRIBUTION CHAMBER

This application is a continuation of prior application Ser. No. 335,113 filed Apr. 7, 1989, now abandoned.

BACKGROUND & SUMMARY OF THE INVENTION

The present invention relates generally to injection molding systems which use a heated torpedo disposed in a cavity plate to heat melt flowing from a let injection nozzle through the cavity plate into a mold cavity, and more particularly, to an improved heated torpedo having an integral construction.

Injection molding is widely used for the manufacture of a variety of items. Injection molding is typically performed by injecting heated, liquid melt into either a single mold cavity or into one or more mold bores, each of which feeds a number of mold cavities. In either application, a heated flowpath must be provided to convey the injected, liquid melt from the injection machine to the mold cavities without interruption. It is therefore desirable to provide a constant application of sufficient heat to the melt flow to keep it liquid while it passes through the mold bore under pressure and into the mold cavities. Heated torpedoes are commonly used for this purpose.

Heated torpedoes of two-piece construction typically use a separate torpedo body having an internal heater and a separate torpedo end which are welded together to form the final heated torpedo. In this type of two-piece construction, the weld which joins the torpedo body to the torpedo end is positioned on the exterior heated surface of the torpedo body, in the flow path of the pressurized liquid melt. Such welds must be carefully examined to ensure that no porosity is present which would allow entrance of the liquid, pressurized melt into the internal heater leading to possible contamination and burnout of the same. This problem described is a typical one or two-piece heated torpedo constructions which utilize separate torpedo bodies and ends.

Additionally, in two-piece torpedo constructions, the heating element may not extend for any significant length into the torpedo end. Such torpedoes are likely to have "cold spots", that is, areas on the torpedo surfaces over which the melt passes which have different and lower temperatures. The previous solution to a torpedo end which exhibited "cold spots" was to apply an external band heater. This solution adds to the cost and complexity of the molding operation.

The present invention is directed to an internally heated torpedo of integral construction which avoids the above shortcomings.

In an internally heated torpedo constructed in accordance with the present invention, an elongate torpedo body axially extends from a torpedo end disposed at the melt inlet end of the torpedo and terminates in a tip at the torpedo body melt outlet end. The torpedo body has a central cavity extending axially from near the torpedo body tip to well inside the enlarged end portion which is adapted to receive a heating element and position that heating element in close proximity to the outer surface of the torpedo body. The torpedo enlarged end contains a series of axial melt flow passages disposed around the torpedo body which passages serve to define the extent of the torpedo body within the enlarged end portion. An end cap is provided on the enlarged end portion and defines a melt flow entrance chamber or flow path to the melt flow passages.

Accordingly, it is a general object of the present invention to provide an internally heated torpedo of improved integral construction for use in injection molding systems.

Another object of the present invention is to provide an internally heated torpedo having a torpedo body terminating at one end in a tip and terminating at the other end in a torpedo enlarged end, wherein the torpedo body has an internal electrical heating element which extends axially within the torpedo body between the tip and within the torpedo enlarged end to provide a uniform and effective heated surface the length of the torpedo for melt to flow.

It is another object of the present invention to provide an internally heated torpedo of integral construction for use in injection molding systems wherein the torpedo has an enlarged end portion at its melt inlet end and an elongate torpedo body portion which axially extends from the enlarged end portion and terminates in a tip at the torpedo melt outlet end and wherein the enlarged end portion includes a plurality of melt flow passages axially extending therethrough in close proximity to the internal heater.

It is still another object of the present invention to provide a heated torpedo having a torpedo body which is integral with a torpedo inlet end and having a heater disposed within the torpedo body which extends for substantially the entire length of the torpedo.

It is still another object of the present invention to provide an internally heated torpedo of integral construction for use in injection molding wherein the torpedo has an enlarged torpedo inlet end having means to receive the melt flow from an injection molding nozzle and means to distribute the melt flow over the heated exterior surface of an elongate torpedo body portion to the torpedo outlet end wherein the torpedo body contains an internal electrical heating element which extends axially between the torpedo inlet and outlet ends.

These and other objects, features and advantages of the present invention will be clearly understood through a consideration of the following detailed description.

BRIEF DESCRIPTION OF THE DRAWINGS

In the course of this description, reference will be frequently made to the attached drawings, in which:

FIG. 1 is a sectional view of an internally heated torpedo incorporating the principles of the present invention;

FIG. 2 is an elevational view of the heated torpedo of FIG. 1 in place within a mold bore in a mold block, the latter being shown in section;

FIG. 3 is a bottom plan view of the heated torpedo of FIG. 2;

FIG. 4 is a top plan view of the heated torpedo of FIG. 2;

FIG. 5 is a sectional view taken along line 5—5 of FIG. 2.

FIG. 6 is a perspective view of the heated torpedo of FIG. 2.

DETAILED DESCRIPTION OF THE INVENTION

A heated torpedo 10 which incorporates the principles of the present invention is shown in its operational environment in FIG. 2. The heated torpedo 10 has a melt inlet end 22 located in an enlarged end 16 thereof and a melt outlet end 20 terminating in a solid tip 14, which may be shaped by machining to achieve the proper tip profile necessary. A generally cylindrical torpedo body 12 axially extends a preselected distance from the generally cylindrical torpedo enlarged end 16. In operation, the torpedo 10 is seated in the mold bore 72 of a cavity plate 74 of a mold block 70 in alignment with the mold gate 77 through the cavity plate 74 which leads to a mold cavity 76.

As best seen in FIG. 1, the torpedo 10 is fabricated from a solid metal torpedo cylindrical member (not shown) which is allowed out when an axial heater cavity 18 is formed in the center of the torpedo member. The heater cavity 18 may be formed by any conventional and suitable means such as drilling or electric discharge machining ("EDM"). The heater cavity 18 extends for substantially the entire length of the torpedo 10 through the torpedo enlarged end 16 and the torpedo body 12 and terminates shortly before the torpedo outlet end 20 proximate to the torpedo tip 14. The heater cavity 18 is spaced a preselected distance from the exterior surface 36 of the hollow torpedo body 12 to provide the most beneficial heat transfer characteristics.

The torpedo inlet end 22 has a generally cylindrical enlarged end 16 which has a diameter greater than that of the torpedo body 12. During fabrication, the difference in the diameters of the torpedo body 12 and torpedo end 16 may be achieved by any suitable machining method. As will be described in greater detail below, because the torpedo is fabricated from a solid metal torpedo cylindrical member, the resulting torpedo is essentially of one piece construction. No separation between the torpedo hollow enlarged end 16 and the torpedo hollow body portion 12 is present on the exterior surface 36 of the hollow torpedo body 12. The hollow torpedo body 12 extends a significant distance up into the hollow torpedo end portion 16 along the centerline of the torpedo heater cavity 18. The extent to which the torpedo hollow body 12 is present within the torpedo hollow enlarged end 16 is defined by the axial melt flow passages 44 passing through the enlarged end 16 and abutting the exterior surface 36 of the torpedo hollow body portion 12.

The torpedo 10 is provided with means for heating the exterior surface 36 of the torpedo body 12, illustrated as a coiled heating element 26, which is disposed in the internal heater cavity 18. The heating element 26 is formed by winding a preselected length of resistance wire 28 around a ceramic rod or core member 30. The heating element 26 has a preselected outer diameter that is less than the torpedo body meter cavity inner diameter to allow easy insertion of the heater into the cavity 18.

The difference in diameters between the heating element 26 and the heater cavity 18 defines an annular space therebetween. This annular space, and the space which may occur at the tip end 19 of the heater cavity 18 is filled with a particulate ceramic refractory material 34, such as magnesium oxide. This ceramic material 34 facilitates the transfer of heat between the internal heating element 26 and the torpedo body exterior surface 36 and also insulates the resistance wire 28 from contact with the inner wall 38 of the torpedo body heater cavity 18. Magnesium oxide is the preferred ceramic refractory material of choice since it has excellent heat transfer capabilities at high temperatures when it is compacted. The powdered magnesium oxide is also preferably finely ground so that it fills the air voids present in the torpedo bore heater cavity annular space.

The heating element rod 30 may have an axial opening 31 passing through its center to receive one end 32 of the resistance wire 28 to convey that wire end 32 toward the enlarged end 16 and to insulate it from contact with the heating element wire coils 29 and the surrounding metal wall 13 of the torpedo body 12. The heating element resistance wire ends 32, 33 exit out of the torpedo 10 through the enlarged end 16 by way of a radial slot 80 which is cut through the sidewall 82 of the torpedo enlarged end 16.

For purposes of monitoring and controlling the amount of heat transferred by the heating element 26 to the exterior surface 36 of the torpedo hollow body 12, a thermowell 40 is placed in the heater cavity annular space. The thermowell 40 extends the entire length of the heater cavity 18, and is adapted to receive a thermocouple 100. The thermocouple 100 allows the temperature of the exterior surface 36 of the torpedo to be monitored and controlled. After insertion into the heater cavity 18, the ceramic material 34 and the heating element 26 are compacted by subjecting the torpedo body to a swaging process. After swaging, the ultimate diameter of the torpedo body 12 is defined.

The heating element 26 has a preferred preselected length such that it extends in the heater cavity 18 between the torpedo tip 14 and up into the torpedo enlarged end portion 16. The lower end of the heating element 26 terminates close to the torpedo tip 14, while the upper end terminates within the torpedo enlarged end 16 close to the electrical wire exit area as define by the radial slot 80. This distance is typically will be one-quarter and three quarters of the length, L, of the enlarged end 16 starting from the torpedo enlarged end mold bore seat 93. (FIG. 2).

After swaging, the resistance wire ends 32, 33 and the thermowell 40 are bent so that they exit the torpedo hollow enlarged end 16 by way of the radial slot 80. The remaining spaces in the torpedo end 16 and radial slot 80, respectively, 84 and 86, are filled with either additional powdered ceramic 34 or a conventional thigh-temperature resistance cement 62. The protruding ends of the resistance wires 32 and 33 and the thermowell 40 may be connected in any conventional manner to exterior power and control wires (not shown) which lead to an appropriate power source via cable 66.

The heater cavity 18 in the torpedo enlarged end 16 is sealed by a metal cover plate 87 which overlies the high-temperature cement 62 and extends through the sidewall 59 of the enlarged end 16 over the heater cavity 18. The cover plate 87 is welded to the enlarged end 16 by an appropriate method to properly seal the heater cavity 18 and enlarged end radial slot 80. The remainder of the radial slot 80 in the sidewall 59 of the torpedo enlarged end 16 is filled by way of a plug weld 88, the outer surface of which is machined to match the configuration of the torpedo end 16. The balance of the heater cavity 18 in the hollow enlarged end 16 is also similarly sealed, which seal is shown as a metal end plug 52 welded to the enlarged end 16. The rear of the end plug 52 preferably includes an enlarged portion 96 of generally hemispherical shaped configuration. This enlarged portion rises above the floor 92 of the melt distribution chamber 58. The end plug 52 completes the extent of the torpedo body portion 12 within the enlarged end 16.

After the insertion of the heating element 26 into the heater cavity 18 and the subsequent swaging of the torpedo body 12, the rear surface 90 of the enlarged end portion 16 is hollowed out to form the floor 92 and the endwall 57 of the enlarged end 16, which together define the melt distribution chamber 58. After forming the melt distribution chamber 58, a plurality of axial melt flow passages 44 are drilled through the torpedo hollow enlarged end 16. As shown in FIG. 1, these axial passages 44 extend completely through the hollow enlarged end 16 and abut the torpedo hollow body exterior surface 36a so that the wall 45 of each axial passage 44 includes a portion 36a of the torpedo hollow body exterior surface 36. (FIGS. 1 & 3). As an alternative to drilling the axial passages 44 may be made in the enlarged end 16 by way of EDM. The axial melt flow passages 44 define the torpedo body exterior surfaces 36a within the torpedo enlarged end 16.

The torpedo hollow body exterior surface portions 36a of these axial passages 44 are spaced the same distance from the heating element 26 as the torpedo hollow body exterior surface 36 and thus the injected melt passing from the melt distribution chamber 58 through the axial passages 44 is heated to the same temperature as the injected melt exiting the axial passages 44 and passing over the torpedo hollow body exterior surface 36. Therefore, the injected melt is virtually always in contact with the torpedo body heated exterior surface 36 as it flows between the inlet end 22 and the outlet end 20 of the torpedo into the mold cavity 76. The heating element 26 extends into the torpedo end 16 up to the radial slot 80, for a distance of between one-quarter and three-quarters of the enlarged end length, L, from the torpedo mold bore seat 93 so that the torpedo body portion integrally formed within the enlarged end 16 is heated when the torpedo is energized. Thus, the likelihood of "cold spots" on the torpedo hollow enlarged end 16 is greatly minimized and the need for an external band heater applied to the enlarged end 16 is eliminated.

The torpedo enlarged end 16 is completed by the insertion of an inlet endcap 54 which fits within the enlarged end endwall 57 and sits on a rim 60 thereof. The inlet endcap 54 is joined to the endwall 59 in an appropriate manner such as by welding. The endcap 54 has a circular melt inlet opening 56 disposed in its center and the interior surface 57 thereof is finished to define a melt distribution chamber 58 in the enclosed portion 59 of the torpedo enlarged end 16. The bottom of the torpedo hollow enlarged end 16 includes a mold bore seat 93 which is separated from the torpedo hollow body exterior surface 36 by means of an annular channel 98 which extends up into the enlarged end 16. The mold bore seat 93 seats on a ledge 71 of the mold 70 and, by virtue of its separation from the torpedo body, minimizes the transfer of heat between the torpedo hollow body exterior surface 36 and the mold cavity plates 74.

Importantly, the torpedo 10, and in particular, the exterior surface 36 of the torpedo body 12 is formed from a single piece of metal, such that no weld junctions are located on the torpedo body exterior surface 36 between the torpedo inlet end 22 and the torpedo outlet end 20. Because of the one-piece construction of the enlarged end portion 16 such that the torpedo body portion 12 and enlarged end portion 16 are integral with each other, the heating element 26 transfers heat to the axial passages 44 of the enlarged end portion 16 and maintains a heat level therein conducive to the flow of liquid melt therethrough.

In operation, either a single injection molding machine nozzle or a hot manifold (not shown) is moved up against the torpedo inlet endcap 54 in an abutting injection relationship with the torpedo melt inlet opening 56. The injected melt flows under pressure through the inlet opening 56 and into the melt distribution chamber 58 where it is distributed to the melt flow axial passages 44 by the heating cavity end plug 52. The injected melt travels through the axial passages 44 and out of the hollow torpedo enlarged end 16 at the annular channel 98 onto the torpedo body exterior surface 36 such that its temperature is maintained by the torpedo internal heating element 26 for the full extent of the torpedo body 12.

The torpedo 10 may also further include means for positioning the torpedo 10 within the mold block bore 72 located on the torpedo body 12 near the tip 14, which are shown in the drawings as radially extending fins 75 which extend out a preselected distance from the torpedo body to contact the mold bore wall 69 and properly position the torpedo tip 14 with respect to the mold cavity gate 77. (FIG. 2) The fins 75 may separate parts which are attached to the torpedo body 12 by any suitable conventional means, such as welding, or they may be machined down from an enlarged diameter portion of the torpedo body at this location.

It will be understood that the embodiment of the present invention which has been described is merely illustrative of one application of the principles of the present invention. Numerous modifications may be made by those skilled in the art without departing from the true spirit of scope of the invention.

I claim:

1. An integral heated torpedo for use in injection molding and for maintaining liquid melt at a temperature conducive to melt flow while the melt is passing over an exterior surface thereof, the torpedo comprising: an elongated heated member having a melt inlet end and a melt outlet end, said elongated heated member having a torpedo body portion extending axially outwardly from a torpedo enlarged and portion thereof, the torpedo body portion having a first diameter and the torpedo enlarged end portion having a second diameter which is greater than the torpedo body portion first diameter, said torpedo enlarged end portion being disposed at the melt inlet end of said elongated heated member, said torpedo body portion being disposed proximate to the melt outlet end of said elongated heated member, said torpedo body portion having an integral sidewall, end tip portion and an inner cavity, the integral sidewall of said torpedo body portion having an exterior surface heated by a heating element, said enlarged end portion being integrally joined to said torpedo body portion, said torpedo body portion further extending within said enlarged end portion, said enlarged end portion including a plurality of melt flow axial passages passing through said torpedo enlarged end portion and opening onto said torpedo body portion, each of the melt flow axial passages being in a heat transfer relationship to the exterior heated surface of said torpedo body portion integral sidewall, said melt flow axial passages further defining an extent of said torpedo body portion integral sidewall exterior heated surface within said enlarged end portion, said torpedo body portion further including an inner axial cavity extending through a central portion of said torpedo body portion and enlarged end portion, the inner axial cavity extending from a first end of the torpedo body portion to a second end of said torpedo body portion and terminating within said torpedo body portion inwardly of the second end of said torpedo body portion, said axial cavity having the heating element disposed therein in a heat transfer relationship with the exterior surface of said torpedo body portion integral sidewall, whereby heat is transferred from said heating element to said torpedo body portion integral sidewall exterior surface to maintain the melt passing over said torpedo body portion integral sidewall exterior surface in a liquid melt flow condition, said plurality of melt flow axial passages defining a flowpath for injected melt through said melt inlet end and said torpedo enlarged end portion over said integral sidewall exterior surface of said torpedo body portion, said elongated heated member further including means disposed within said torpedo enlarged end portion for distributing melt injected into said melt inlet end of said elongated heated member over said torpedo body portion integral sidewall exterior surface, the melt distribution means including a generally annular melt distribution chamber, said melt distribution chamber having means for directing liquid melt entering said torpedo melt flow inlet end into said plurality of melt flow axial passages, the melt distribution chamber having a general inner annular diameter which is equal or less than said torpedo body portion first diameter and a general outer annular diameter which is greater than said torpedo body portion first diameter.

2. The integral heated torpedo of claim 1, wherein said heating element includes a resistance wire heater and temperature sensing and controlling means including a thermocouple disposed said heating element and the temperature sensing and controlling means being embedded in a particulate ceramic refractory material in said axial cavity.

3. The integral heated torpedo of claim 1, wherein said heated member includes mold positioning means extending radially outwardly from and integral with said torpedo body portion sidewall.

4. The integral heated torpedo of claim 1, wherein said heating element extends between said melt inlet and outlet ends within said elongated heated member inner axial cavity, one end of said heating element being proximate to said melt outlet end and an opposite end of said heating element extending a preselected distance into said enlarged end portion of between one-quarter and three-quarters of an axial length of said enlarged end portion defined by top and bottom surfaces of said enlarged end portion.

5. The integral heated torpedo of claim 1, wherein said torpedo enlarged end portion includes a mold cavity plate seat, the mold cavity plate seat being separated from said torpedo body portion by an annular channel, said axial passages opening into the annular channel, said annular channel providing a space between said exterior surface of said torpedo body portion and said mold cavity plate seat.

6. The integral heated torpedo of claim 1 wherein each of said melt flow axial passage torpedo body portion integral sidewall exterior surface portions extends completely through said torpedo enlarged end within said melt flow axial passages and into said melt distributing means, thereby providing a heated surface of said elongate heated member within said melt flow axial passages, said melt flow axial passages being arranged in a generally semi-circular pattern within said melt distribution chamber.

7. An electrically heated torpedo having a melt inlet end and a melt outlet end, the torpedo having an elongated metal body portion having a first torpedo diameter and disposed between an enlarged end portion thereof and the melt outlet end, the enlarged end portion having a second torpedo diameter which is greater than the first torpedo diameter portion, said enlarged end portion being disposed at the melt inlet end thereof, said metal body portion having a heated exterior surface of said torpedo defined by said first torpedo diameter, said enlarged end portion having a plurality of melt flow passages disposed therein, said plurality of melt flow passages axially extending through said enlarged end portion and opening onto at least one-half of a circumference of the body portion heated exterior surface, said body portion heated exterior surface extending into said torpedo enlarged end for a predetermined length of said melt flow axial passages, said metal body having a central axial cavity disposed therein which is adapted to receive an elongated heating element therein for providing heat to said torpedo exterior surface, the central axial cavity extending within said body portion from a first end thereof and terminating inwardly of a tip portion of said body portion, said central axial cavity defining an integral sidewall and tip portion of said body portion, said integral sidewall and tip portions of said body portion being integral with said enlarged end portion, said enlarged end portion including means for internally distributing melt from said metal inlet end through said plurality of melt flow axial passages, the melt distributing means including a general annular distribution passage disposed generally centrally within said enlarged end portion, said distribution passage interconnecting said melt inlet end and all of said plurality of melt flow axial passages, passage having a general outer diameter which is greater than said torpedo first diameter, said melt distributing means further including a raised portion which defines a general inner diameter of said annular passage.

8. The electrically heated torpedo of claim 7, wherein said plurality of melt flow axial passages are disposed in said body enlarged end around the periphery of said exterior heated surface in a generally semi-circular pattern, and wherein said melt distribution means distribution passage raised portion includes an enlarged generally hemispherical protrusion.

9. The electrically heated torpedo of claim 7, wherein said torpedo body portion includes means for positioning said torpedo body portion in a mold bore, said torpedo body portion positioning means including a fin member formed integrally with and extending outwardly from said torpedo body portion.

10. The electrically heated torpedo of claim 7 wherein said torpedo body enlarged end portion includes a mold cavity plate seat disposed opposite said metal body melt inlet end, the mold cavity plate seat having an annular depression separating said mold cavity plate seat from said metal body heated exterior surface, said melt flow axial passages opening into the annular depression.

11. The electrically heated torpedo of claim 7 wherein said elongated heating element extends into said enlarged end portion for between one-quarter and three quarters of a length of said enlarged end portion.

12. An internally heated integral torpedo for use in injection molding and for insertion into a mold bore during injection molding for providing a heated surface for injected melt to flow over as the injected melt passes through the mold bore into a mold cavity, the torpedo comprising: a generally cylindrical elongated member formed from a single piece of metal, the elongated member having a torpedo hollow body portion of a first diameter formed integral with a torpedo hollow end portion of a second diameter, the torpedo hollow end portion second diameter being greater than the torpedo hollow body portion first diameter, said torpedo hollow body portion including a central cavity extending a preselected distance within said torpedo hollow body portion and defining an integral sidewall and tip portion of said torpedo hollow body portion, the torpedo hollow body portion central cavity having a heating element disposed in said torpedo hollow body portion central cavity a predetermined distance from an exterior surface of said torpedo hollow body portion in a heat transfer relationship therewith, such that said heating element heats the torpedo hollow body portion exterior surface when energized, said hollow body portion central cavity also extending a preselected distance into said torpedo hollow end portion, said torpedo hollow end portion including a plurality of melt transfer passages axially extending therethrough and disposed longitudinally in said torpedo hollow end portion in a region between said torpedo hollow body portion first diameter and said torpedo hollow end portion second diameter and means for distributing the melt injected into said melt transfer passages, the melt distribution means including an internal melt distribution chamber located in said torpedo body end portion, the internal melt distribution chamber having a general annular configuration, said annular chamber having a general inner annular diameter and a genera outer annular, the distribution chamber general outer diameter being greater than the torpedo hollow body portion first diameter, the annular chamber general inner diameter being equal to or less than said torpedo hollow end portion second diameter, whereby said melt distribution chamber opens into said plurality of melt transfer passages, said plurality of melt transfer passages being arranged in a generally semi-circular pattern within said torpedo hollow end portion, said torpedo hollow body portion exterior surface extending axially within each of said melt transfer passages and further defining an end position of said torpedo hollow body portion within said torpedo hollow end portion, said torpedo hollow end portion having a melt inlet opening therein in melt flow communication with said internal melt distribution chamber thereof, thereby providing a path for transfer of heated melt injected into said torpedo end portion to said mold cavity through said torpedo hollow end portion melt transfer passages over substantially all of the exterior surface of said torpedo hollow body portion, said torpedo hollow end portion further including means for exiting said torpedo hollow end portion including an opening which is adapted to receive power and control wires for energizing said heating element and controlling any heat generated thereby.

13. The internally heated torpedo of claim 12, wherein said torpedo hollow end portion further includes a torpedo mold bore seat, said torpedo hollow end portion including an annular groove therein, the annular groove separating said torpedo mold bore seat from said torpedo hollow body portion, said melt transfer passages opening into said torpedo hollow end portion annular groove.

14. The internally heated torpedo of claim 12, wherein said heating element extends into the central cavity portion of said torpedo hollow end portion.

15. The internally heated torpedo of claim 12, further including means for positioning said torpedo within said mold bore, said positioning means including a fin member extending outwardly from said torpedo hollow body portion.

16. The internally heated torpedo of claim 12, wherein said melt distribution means further includes an enlarged central portion having a general hemispherical configuration.

* * * * *